(12) United States Patent
Reddehase et al.

(10) Patent No.: US 11,168,733 B2
(45) Date of Patent: Nov. 9, 2021

(54) BALL JOINT, IN PARTICULAR FOR A CHASSIS OF A MOTOR VEHICLE, AND METHOD FOR FITTING SUCH A BALL JOINT

(71) Applicant: ZF FRIEDRICHSHAFEN AG, Friedrichshafen (DE)

(72) Inventors: Günter Reddehase, Brockum (DE); Janina Altmeppen, Meppen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 630 days.

(21) Appl. No.: 16/094,867

(22) PCT Filed: Mar. 24, 2017

(86) PCT No.: PCT/EP2017/057033
§ 371 (c)(1),
(2) Date: Oct. 18, 2018

(87) PCT Pub. No.: WO2017/182230
PCT Pub. Date: Oct. 26, 2017

(65) Prior Publication Data
US 2019/0120285 A1 Apr. 25, 2019

(30) Foreign Application Priority Data
Apr. 22, 2016 (DE) ...................... 10 2016 206 864.4

(51) Int. Cl.
*F16C 11/06* (2006.01)
*B62D 7/16* (2006.01)

(52) U.S. Cl.
CPC ............ *F16C 11/0642* (2013.01); *B62D 7/16* (2013.01); *F16C 11/069* (2013.01)

(58) Field of Classification Search
CPC . F16C 11/0685; F16C 11/069; F16C 11/0638; F16C 11/0647; F16C 11/0642
See application file for complete search history.

(56) References Cited

U.S. PATENT DOCUMENTS

| 2,424,431 A | | 7/1947 | Booth |
| 3,849,009 A | * | 11/1974 | Bourdon ............. F16C 11/0633 |
| | | | 403/133 |
| 4,076,344 A | * | 2/1978 | Gaines ................ F16C 11/0638 |
| | | | 384/213 |

(Continued)

FOREIGN PATENT DOCUMENTS

| DE | 37 23 548 | 1/1988 |
| DE | 10 2005 028 515 | 12/2006 |

(Continued)

*Primary Examiner* — Daniel J Wiley
(74) *Attorney, Agent, or Firm* — Cozen O'Connor (57) ABSTRACT

A ball joint, particularly for a chassis of a motor vehicle having a housing with a first opening surrounded by a circumferential forming edge. The housing has at an end opposite the first opening, a closing force absorber for absorbing a closing force F required for a deformation of the circumferential forming edge, which closing force absorber extends in a trough-shaped manner toward the housing interior in direction of the first opening. A method for fitting a ball joint, having a counter-holder of a closing device surroundingly received by the closing force absorber during a closing of the housing.

15 Claims, 4 Drawing Sheets

(56) References Cited

U.S. PATENT DOCUMENTS

| | | | | |
|---|---|---|---|---|
| 4,193,707 A | * | 3/1980 | Doden | B62D 7/18 403/133 |
| 7,644,500 B2 | * | 1/2010 | Schmidt | F16C 11/0685 29/898.044 |

FOREIGN PATENT DOCUMENTS

| | | |
|---|---|---|
| DE | 10 2008 003463 | 7/2009 |
| FR | 2 216 853 | 8/1974 |
| JP | 2001 263331 | 9/2001 |
| WO | WO 2006/133693 | 12/2006 |

* cited by examiner

BALL JOINT, IN PARTICULAR FOR A CHASSIS OF A MOTOR VEHICLE, AND METHOD FOR FITTING SUCH A BALL JOINT

CROSS REFERENCE TO RELATED APPLICATION

This is a U.S. national stage of application No. PCT/EP2017/057033, filed on Mar. 24, 2017. Priority is claimed on German Application No. DE102016206864.4, filed Apr. 22, 2016, the content of which is incorporated herein by reference.

BACKGROUND OF THE INVENTION

1. Field of the Invention

The invention is directed to a ball joint, particularly for a chassis of a motor vehicle, and to a method for fitting a ball joint of this type.

2. Description of the Prior Art

Ball joints for chassis in motor vehicles are known from the prior art and are used, for example, in track bars, steering rods or Panhard rods, and in steering component parts, for example, trailing links or control arms. A ball joint with a housing constructed as an axial ball joint is known from DE 10 2005 028 515 A1. The housing has a first opening that is surrounded by a circumferential forming edge. In the course of fitting the ball joint, the housing is closed by deforming the forming edge in direction of a joint ball. By closing the housing, the joint ball is enclosed in the housing so as to be rotatably and swivelably movable. The force required for closing the housing through deformation of the circumferential forming edge is referred to generally as closing force. The closing force preferably acts in direction of a central axis of the housing. In practice, the housing is received in a closing device while it is being closed, and the closing force is directed into the forming edge. The closing force is then directed into a bottom part of the closing device via the housing.

SUMMARY OF THE INVENTION

It is an object of one aspect of the invention to provide a ball joint having a housing that safely absorbs the closing force and directs it into a closing device with accurate repeatability without the housing being stressed beyond a permissible extent.

One aspect of the invention provides a ball joint, in particular for a chassis of a motor vehicle. The ball joint has a housing with a first opening surrounded by a circumferential forming edge. According to the invention, the housing has at an end opposite the first opening a closing force absorber for absorbing a closing force required for a deformation of the circumferential forming edge, which closing force absorber extends in a trough-shaped manner toward the housing interior in direction of the first opening.

As a result of the invention, a ball joint is provided that safely absorbs the closing force and routes it into a closing device with accurate repeatability without stressing the housing beyond the permissible extent. The closing force absorber forms a trough-shaped recess in the housing through which the ball joint can be positioned accurately in the closing device over the course of assembly. The closing force absorber can be formed, for example, as a curved portion of a spherical segment surface, also known as a spherical cap. The closing force absorber can also be pierced centrally so that the closing force absorber is formed merely by an annular portion of the trough-shaped recess. The forming edge can be a circumferential compressing edge or a circumferential hem edge. Both constructions are formed at least substantially hollow-cylindrically prior to fitting. The compressing edge has a greater wall thickness than the hem edge. In particular, the housing is formed in one piece as a casting or forging. The closing force absorber extending in a trough-shaped manner toward the interior of the housing has, in particular, a periphery that merges into a housing surface and forms a closed polyline extending at least substantially in a plane. The ball joint can be formed as a radial ball joint or as an axial ball joint.

With regard to ball joints, there is a distinction between axial ball joints and radial ball joints. This distinction is determined by the respective principal loading direction of the forces acting on the ball studs of the two types of ball joint in the installed state. The position of the undeflected ball joint serves as a reference for defining the two types of ball joint, where the ball stud is considered undeflected when it can be swiveled by the same angular deflection in all possible directions proceeding from the undeflected position. Therefore, the undeflected position is also referred to as zero position or neutral angular position. The principal loading direction of an axial ball joint lies in direction of the longitudinal central axis of the ball stud, while in the case of a radial ball joint the principal loading direction extends perpendicular to the longitudinal central axis of the ball stud. Therefore, the two types of ball joint differ from one another basically with respect to the loads acting upon them and accordingly also with respect to construction. Accordingly, a chief requirement for axial ball joints consists in supporting a joint ball of the ball stud in a housing of the axial ball joint such that the ball stud cannot be disengaged from the housing under a tensile load. This so-called pull-out force of the axial ball joint is a key quality criterion for an axial ball joint. In radial ball joints, the ball stud is loaded by forces acting on the ball stud radial to its longitudinal central axis. Consequently, the pull-out force of the ball stud in radial ball joints is less than that in axial ball joints, which is reflected in the construction of the housing.

The closing force absorber is preferably formed as a column-shaped recess. This has the advantage that a bottom part of the closing device can be brought into a positive engagement with the housing. "Column-shaped recess" in this context means a recess formed in an interior of the housing, for example, by a column-shaped tool die in the course of a cold solid forming of the housing. The column-shaped tool die has, at least along the depth by which it penetrates into the housing, a cross-sectional surface area which, in any cross sections parallel to a planar end face of the tool die facing the housing, corresponds to the respective end face. The column-shaped recess can be formed, for example, in the manner of a blind hole. "Blind hole" in this context refers to a recess like a trough-shaped depression which does not pass completely through the housing, i.e., has a defined depth.

The closing force absorber is advantageously formed rotationally symmetrically and has an axis of rotation which coincides with a central axis of the housing. The rotationally symmetrical construction of the closing force absorber facilitates the production of same because rotationally symmetrical contours are generally easier to produce than geometries which are not rotationally symmetrical. Assembly is facilitated in particular when, in addition to the closing force absorber, the entire housing is simultaneously formed so as to be rotationally symmetrical because there is no need for aligning with the central axis of the housing when inserting the ball joint into the closing device. Because the rotational axis of the closing force absorber is coincident with the central axis of the housing, there is, in addition, an advantageous symmetrical loading of the housing when closing the housing.

In particular, the housing has an outer circumferential surface that is rotationally symmetrical at least in some portions and an inner circumferential surface which is likewise rotationally symmetrical at least for the most part. The axes of rotation of the outer circumferential surface and of the inner circumferential surface are congruent and coincide with the central axis of the housing. In particular, the closing force acts in direction of the central axis of the housing. As was described above, the closing force absorber extending in a trough-shaped manner toward the interior of the housing has a periphery, which merges into a housing surface and which forms a closed polyline extending at least substantially in a plane. This plane preferably extends perpendicular to the central axis of the housing.

According to a preferred embodiment, the closing force absorber has a circumferential, planar axial abutment surface that extends perpendicular to the central axis and which is exposed in direction of the central axis. Due to the fact that the axial abutment surface, which in itself is planar, extends perpendicular to the central axis, unwanted transverse force components are prevented from occurring in the housing when the closing force is transmitted into the housing. The planar construction of the axial abutment surface ensures a favorable routing of the closing force into the bottom part of the closing device, which bottom part advantageously has an axial receiving surface corresponding in shape to the axial abutment surface. Due to the embracing contact of the two aforementioned surfaces during the closing of the housing, the surface pressure in this area is kept low. In this context, the property of the axial abutment surface being exposed in direction of the central axis means that the closing force absorber has no undercuts proceeding from the axial abutment surface in direction of the central axis toward the exterior of the housing. This allows an unimpeded access of the closing device to the axial abutment surface. In this way, the bottom part of the closing device can have full surface contact with the axial abutment surface.

The axial abutment surface is advisably formed as a cutting-machined surface. In particular, the axial abutment surface is produced by turning or milling. A greater precision is achieved by a cutting machining compared to a cast or forged housing surface which is not machined. In this way, stress peaks at points in the region of the axial stop surface can be prevented when introducing the closing force into the housing.

The axial abutment surface is preferably formed as an annular surface. In this case, the closing force absorber is preferably centrally pierced so as to afford a passage for other component parts of the ball joint, for example.

The closing force absorber advantageously has a radial centering surface formed as a cylindrical lateral surface and arranged adjoining the axial abutment surface. By forming the radial centering surface as a cylindrical lateral surface, an advantageous positioning aid is provided for insertion of the ball joint into the bottom part of the closing device. Further, the radial centering surface provides a possibility by which the ball joint can be reliably received by the bottom part of the closing device during assembly of the ball joint.

The bottom part preferably has a radial receiving surface corresponding in shape to the radial centering surface. The radial centering surface is formed in particular as a cutting-machined surface, in particular by turning or circular milling. The trough-shaped quality of the closing force absorber is realized by the adjoining arrangement of axial abutment surface and radial centering surface.

According to an advantageous further development, the closing force absorber has a circumferential bevel at a periphery facing the exterior of the housing. The bevel provides a joining aid which facilitates the insertion of the ball joint into the closing device. Toward the exterior of the housing, the bevel has a periphery, already described, which merges into the housing surface and which forms a closed polyline and extends at least substantially in a plane arranged perpendicular to the central axis.

The ball joint preferably has a ball stud that is rotatably movably and swivelably movably supported in the housing by a joint ball and extends out of a second opening of the housing in direction of the central axis in an undeflected state. The second opening of the housing is arranged at an end of the housing opposite the first opening, which first opening is surrounded by the circumferential forming edge. The axial abutment surface in this embodiment is formed as an annular surface with a central passage from which the ball stud extends out of the housing. By closing the housing, the joint ball is enclosed in the housing so as to be rotatable and swivelable. The housing is closed by means of deformation, in particular cold forming, of the forming edge in direction of the joint ball.

The ball stud is considered undeflected when it can be swiveled out of the undeflected position in all possible directions by the same angular deflection. For this reason, the undeflected position is also referred to as zero position or neutral angular position. In the undeflected position of the ball stud, which is formed in particular at least substantially rotationally symmetrically, the rotational axis of the ball stud coincides with the central axis of the housing. Aside from the embodiment form described above in which the ball stud extends out of the second opening of the housing in direction of the central axis, it is also possible alternatively that the ball stud extends out of the first opening of the housing, which is surrounded by the forming edge. In this construction, the closing force absorber is arranged in the area of the second opening of the housing, and the second opening is arranged at an end of the housing opposite the first opening. The closing force absorber in this case is formed in particular as a blind hole-like recess of the housing having a second opening facing toward the exterior of the housing.

Further preferably, the axial abutment surface lies partially outside of the joint ball in a projection in direction of the central axis. Accordingly, the greatest diameter of the axial abutment surface is greater than the diameter of the joint ball. This makes possible an angular deflection of the ball stud that is relatively high for axial ball joints, where the angular deflection is adapted to a maximum angular deflection customary in radial ball joints. Accordingly, the ball joint, when formed as axial ball joint, can substitute for a radial ball joint with respect to the maximum possible angular deflection of the ball joint so that generally new possibilities are created for using axial ball joints. As a result of the larger diameter of the axial abutment surface compared to the diameter of the joint ball, the closing force is transmitted in direction of the central axis directly via a solid wall portion of the housing so that impermissible deformations of the housing are prevented during the closing of the housing.

The first opening of the housing is advisably closed by a base. In particular, the housing has in the area of the first opening a diameter which is greater than the diameter of the joint ball before the housing has been closed, i.e., when the forming edge is not yet deformed. Accordingly, the joint ball can be inserted into the housing through the not-yet-finished first opening over the course of fitting the ball joint. The housing is closed by the base in the area of the first opening after fitting the ball stud and possibly further component parts of the ball joint, for example, a bearing shell, in order to protect the joint ball and the bearing support thereof against contamination. Further, the base can be configured to absorb forces acting in direction of the central axis in the installed state of the ball joint, in particular when the ball joint is constructed as axial ball joint. The base can be formed as a turned part or as a rotationally symmetrical extruded part having a thickness which varies in direction of the central axis or, alternatively, as a lid-shaped sheet metal part.

The base and the circumferential forming edge advantageously share a mutual contact surface formed as a frustoconical lateral surface or as an annular surface. During the closing of the housing, the base is completely and sealingly enclosed by the forming edge. In case of axial ball joints, the closing of the housing is often carried out by compressing the forming edge in direction of a joint ball. In this case, the forming edge is also referred to as compressing edge. In its initial state before deformation, the compressing edge has a relatively large thickness measured perpendicular to the central axis so that it is not possible to fold the compressing edge by 90 degrees but only by approximately 45 degrees. Therefore, the mutual contact surface of the base, which is formed particularly as a turned part or as a rotationally symmetrical extruded part having a thickness which varies in direction of the central axis, and of the circumferential compressing edge is formed as a frustoconical lateral surface.

In case of radial ball joints, the closing of the housing is often carried out by folding the forming edge in direction of a joint ball, particularly by roller hemming. In this case, the forming edge is also referred to as a hem edge. In the initial, undeformed state, the hem edge has a relatively small thickness measured perpendicular to the central axis so that it is possible to fold the hem edge by approximately 90 degrees. Therefore, the mutual contact surface of the base, which is formed particularly as a lid-shaped sheet metal part, and the circumferential hem edge is formed as an annular surface in this configuration.

The base preferably has a threaded pin formed integrally with the base and which extends in direction of the central axis. The threaded pin serves to connect the ball joint, formed particularly as axial ball joint, to a connection component part. The one-piece construction allows a functional integration, and the base with integrated threaded pin is preferably formed as a turned part, in particular as a CNC turned part. The base has, particularly at the outer circumference thereof, a driving geometry that is suitable, for example, for applying an open-end wrench to connect the threaded pin of the base to the connection component part in this way. The driving geometry can be formed, for example, by at least two wrench faces spaced apart parallel to one another, particularly a hexagon. In particular, the housing has inwardly a stop surface for the base, which stop surface is formed as an annular surface and extends perpendicular to the central axis. The stop surface which is arranged inside the housing and is exposed toward the outside of the housing toward the base provides an axial stop which allows the base to be reproducibly positioned over the course of fitting the ball joint in direction of the central axis.

The housing is advantageously formed like a sleeve with a housing interior piercing the housing completely in direction of the central axis. The embodiment form described above can be implemented with a housing formed in this manner, where the ball stud extends out of a second opening of the housing. The sleeve-like housing is completely rotationally symmetrical in particular, i.e., for example, formed without driving geometry.

In an advantageous further development, the housing has a connection pin that is connected integrally to the housing and extends at least substantially perpendicular to the central axis. An angle joint is provided in this way. Within the context of the present invention, "angle joint" means a ball joint that offers a first possibility for a pin-type connection for a first component part and, at least substantially perpendicular thereto, a second possibility for a pin-type connection for a second component part. Since the ball stud is, inter alia, rotatably movably supported in the housing, it can be connected to a connection component part, for example, a steering rod or a track bar, so as to be changeable in length, for example, via a threaded connection. The connection pin may also be slightly angled and, for this reason, may not extend exactly perpendicular to the central axis.

The invention is further directed to a method for fitting a ball joint such as that described above, wherein a counter-holder of a closing device is surroundingly received by the closing force absorber when closing the housing. The counter-holder is associated in particular with the bottom part of the closing device, which closing device can be formed as a compressing device or as a hemming device, in particular as a roller hemming device. The closing force applied by the closing device acts in particular in direction of a central axis of the closing device, where the central axis of the closing device is preferably congruent with the central axis of the housing. Because the counter-holder is surroundingly received by the closing force absorber, it is ensured that the closing force acting in direction of the central axis of the housing can be reliably transmitted from the housing into the counter-holder. The counter-holder is formed so as to correspond in shape to the closing force absorber and bears with its full surface against the axial abutment surface.

The radial centering surface and a corresponding surface of the counter-holder have, in particular, a clearance fit with respect to one another with a relatively small clearance so that the housing of the ball joint can be easily inserted into the closing device on the one hand and so that the housing is securely fixed in position in the closing device particularly during the closing process on the other hand. The shape-corresponding surfaces of the closing force absorber and of the counter-holder are machined by cutting in particular and therefore have a high dimensional and positional precision. As a result of the diameter of the axial abutment surface being larger than the diameter of the joint ball, the closing force is transmitted in direction of the central axis directly via the solid wall portion of the housing so as to prevent impermissible deformations of the housing during the closing of the housing.

BRIEF DESCRIPTION OF THE DRAWINGS

The invention will be described more fully in the following referring to drawings which only show embodiment examples. Like or corresponding component parts or elements constructed at least substantially identically are denoted by identical reference numerals or reference numerals preceded by a "1". The drawings show.

DETAILED DESCRIPTION OF THE PRESENTLY PREFERRED EMBODIMENTS

Figure 1:
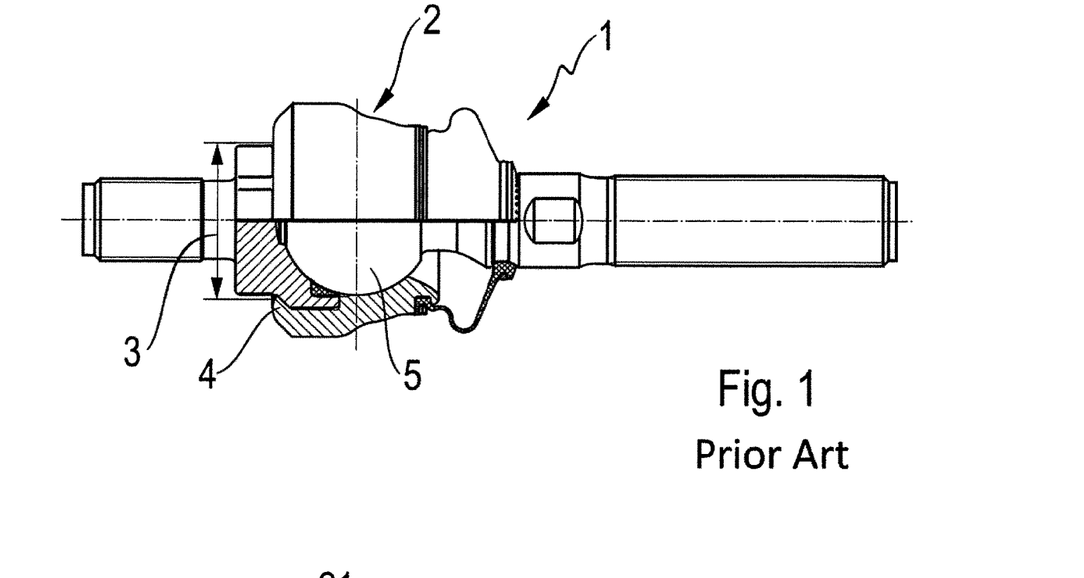
FIG. 1 is a two-dimensional view of a prior art ball joint.

FIG. 1 shows a ball joint formed as an axial ball joint 1 and which has a housing 2 having a first opening 3 surrounded by a circumferential forming edge 4. Over the course of fitting the axial ball joint 1, the forming edge 4 is deformed in direction of a joint ball 5 and the housing 2 is closed in this way. The joint ball 5 is rotatably movably and swivelably movably enclosed in the housing 2 when the housing 2 is closed.

Figure 2:
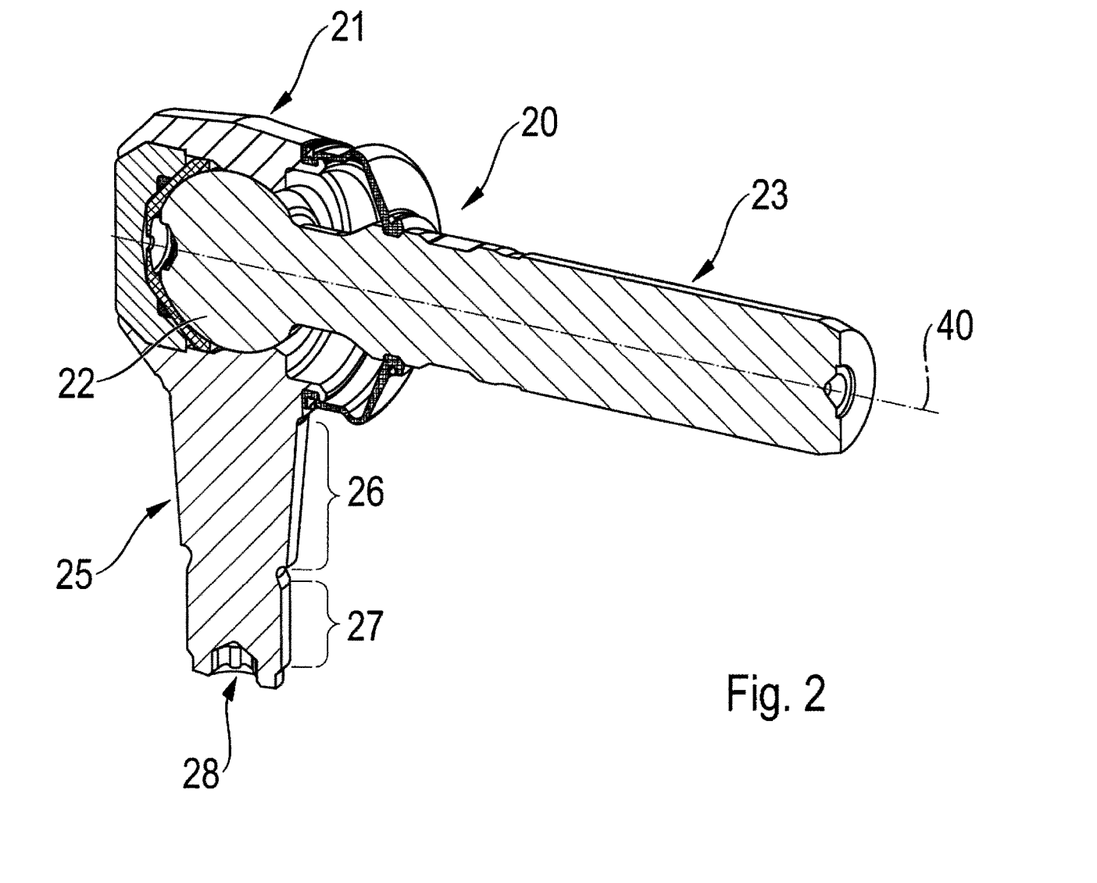
FIG. 2 is a perspective sectional view of a ball joint.

FIG. 2 shows a ball joint formed as an axial ball joint 20. The axial ball joint 20 is formed as an angle joint and has a housing 21 and a ball stud 23 that is rotatably movably and swivelably movably supported in the housing 21 by a joint ball 22. The ball stud 23, which is shown in the undeflected state, extends out of the housing 21 in direction of a central axis 40 of the housing 21. The housing 21 has a connection pin 25 that is connected integral with the housing 21 and that extends perpendicular to central axis 40. The connection pin 25 has a conical portion 26 for connecting the connection pin 25 to a wheel carrier. The connection pin 25 further has a fastening thread 27 at its free end and a driving geometry 28 formed as inner contour at its front side, which driving geometry 28 is formed as an internal hexagon geometry 28.

Figure 3:
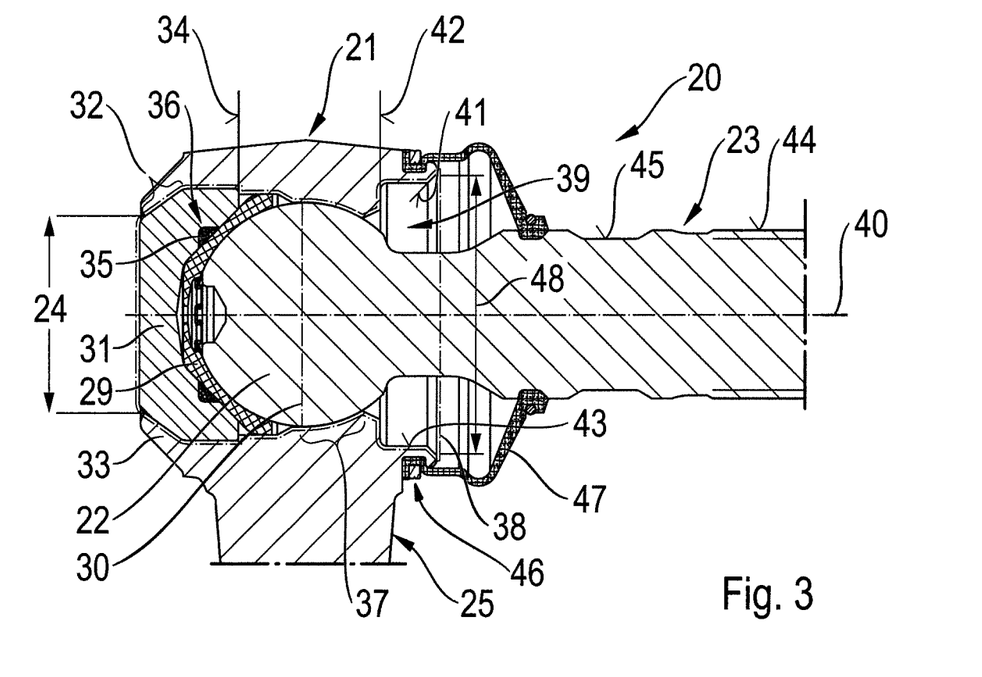
FIG. 3 is a sectional view of a portion of the ball joint from FIG. 2.

As can be seen from FIG. 3, a plastic bearing shell 29, which snugly encircles less than half of the joint ball 22, is arranged in the housing 21. The plastic bearing shell 29 is constructed rotationally symmetrically with a rotational axis extending in direction of the central axis 40 and does not extend beyond the so-called equator 30 of the joint ball 22. In this regard, the "equator" 30 means the circumferential line of a circular area having the diameter of the joint ball 22 and simultaneously extending perpendicular to the central axis 40 when the ball stud 23 is not deflected. A first opening 24 of housing 21, also referred to as base-side opening, is closed by a base 31, which is formed as a turned part having a thickness that varies in direction of the central axis 40. The first opening 24 is arranged opposite a second opening 48, also referred to as stud-side opening, in direction of the central axis 40. The ball stud 23 extends through the second opening 48 out of housing 21.

Base 31 and housing 21 have a mutual contact surface 32 which is formed in the manner of a frustoconical lateral surface. The frustoconical lateral surface extends from the first opening 24 toward the interior of the housing and is oriented such that its rotational axis runs in direction of the central axis 40 and the end of the frustoconical lateral surface having the smaller diameter faces toward the outside of the housing. In the axial section according to FIG. 3, the frustoconical lateral surface includes an angle of approximately 45 degrees relative to the central axis 40. A contact surface associated with housing 21 and a shape-corresponding contact surface of the base 31 contact one another in the mutual contact surface 32.

In the assembled state shown in FIG. 3, a circumferential forming edge 33 of housing 21 contacts the base 31 in the region of the mutual contact surface 32. The contact surface of the circumferential forming edge, which is formed as a compressing edge 33, is formed circumferentially in the manner of a cylindrical lateral surface before the base 31 is pressed into the housing 21. The contact of the circumferential compressing edge 33 with the base 31 by the mutual contact surface 32 takes place through a simultaneous compression of the compressing edge 33 in its entirety by a compression bell moving in direction of the central axis 40 toward the housing 21. The housing 21 has inwardly a stop surface 34 for the base 31, which stop surface 34 is formed as an annular surface. The stop surface 34 extends perpendicular to the central axis 40. A spring element acting in direction of the central axis 40 is arranged between the base 31 and the plastic bearing shell 29 and is formed as a circumferential elastomeric ring 35. The elastomeric ring 35 is inserted into an annular groove 36 of the base 31 and is accordingly protected against unwanted displacement.

The joint ball 22 directly abuts the housing 21 in an abutment area 37 of the housing 21. In this way, the joint ball 22 is supported in the abutment area 37 directly at the housing 21, which results in a high load bearing capacity of the ball stud 23 in direction of central axis 40. The abutment area 37 of the housing 21 is formed as a spherical zone with a rotational axis running in direction of central axis 40. In direction of central axis 40, the abutment area 37 is arranged in relation to the joint ball 22 opposite the area in which the plastic bearing shell 29 contacts the joint ball 22. The abutment area 37 of the housing 21 does not extend beyond the equator 30 of the joint ball 22 in direction of the central axis 40 because the joint ball 22 of the ball stud 23 could not be fitted in this case. An edge layer of the abutment area 37 is surface-hardened. The surface hardening is in the form of induction hardening.

A closing force absorber 39 is formed in the manner of a column-shaped recess in an interior space 38 of the housing. The closing force absorber 39 extends in a trough-shaped manner from the second opening 48 of housing 21 toward the interior of the housing in direction of the first opening 24. The housing interior 38 is enclosed by a dash-dot line in FIG. 3. For the sake of clarity, the dash-dot line is not congruent with the contour line bounding the housing interior 38. The closing force absorber 39 is formed so as to be rotationally symmetrical and has a rotational axis that coincides with the central axis 40 of housing 21. At an edge facing the outside of the housing, the closing force absorber 39 has a circumferential bevel 41 to facilitate insertion into a compressing device.

The closing force absorber 39 has a circumferential axial abutment surface 42 that extends perpendicular to central axis 40 and is constructed as an annular surface exposed in direction of central axis 40. In a projection in direction of the central axis 40, the axial abutment surface 42 lies partially outside of the joint ball 22. The greatest diameter of the axial abutment surface 42 is greater than the greatest diameter of the base 31, which is identical to the greatest diameter of the stop surface 34. At the same time, there is no inner diameter of the housing 21 that is greater than the greatest diameter of the base 31 in direction of the central axis 40 between the stop surface 34 and the axial abutment surface 42. Further, the closing force absorber 39 has a circumferential radial centering surface 43, which adjoins the axial stop surface 42 and is formed as a cylindrical lateral surface extending in direction of the central axis 40.

A circumferential bellows groove 46 for receiving a likewise circumferential connection area of a seal bellows 47 is inserted in an outer wall of housing 21 at the same height as the radial centering surface 43 in direction of the central axis 40. By arranging the bellows groove 46 at the end side of the housing, the seal bellows 47 can be constructed relatively compactly in direction of central axis 40. The ball stud 23 is formed with an external thread 44 having a thread length that is greater in direction of central axis 40 than the thread length of the fastening thread 27 of the connection pin 25. Further, the ball stud 23 has at its outer circumference two wrench faces 45 which are spaced apart parallel to one another.

Figure 4:
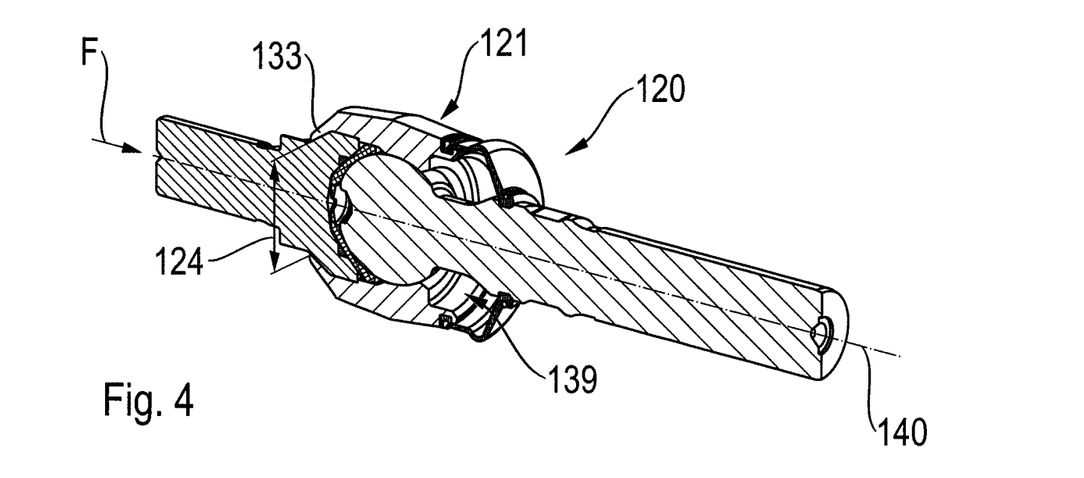
FIG. 4 is a perspective sectional view of a ball joint.

FIG. 4 shows a ball joint constructed as an axial ball joint 120. The ball joint 120 has a housing 121 having a first opening 124. The first opening 124 is surrounded by a circumferential forming edge 133. Housing 121 has at an end opposite the first opening 124 a closing force absorber 139 for receiving a closing force F required for deforming the circumferential forming edge 133, which closing force absorber 139 extends in a trough-shaped manner toward the interior of the housing in direction of the first opening 124. The closing force absorber 139 extending toward the interior of the housing in a trough-shaped manner has a periphery which merges with a housing surface and which forms a closed polyline and extends at least substantially in a plane. The circumferential forming edge is formed as a circumferential compressing edge 133.

The closing force absorber 139 is formed rotationally symmetrically in the manner of a column-shaped recess and has a rotational axis that coincides with a central axis 140 of housing 121. Housing 121 has a rotationally symmetrical outer circumferential surface and a rotationally symmetrical inner circumferential surface. The rotational axes of the outer circumferential surface and of the inner circumferential surface are congruent and coincide with the central axis 140 of housing 121. The closing force F acts in direction of the central axis 140 of housing 121. As was described above, the closing force absorber 139 which extends in a trough-shaped manner toward the housing interior has a periphery which merges with a housing surface and which forms a closed polyline extending perpendicular to the central axis 140 of housing 121.

Figure 5:
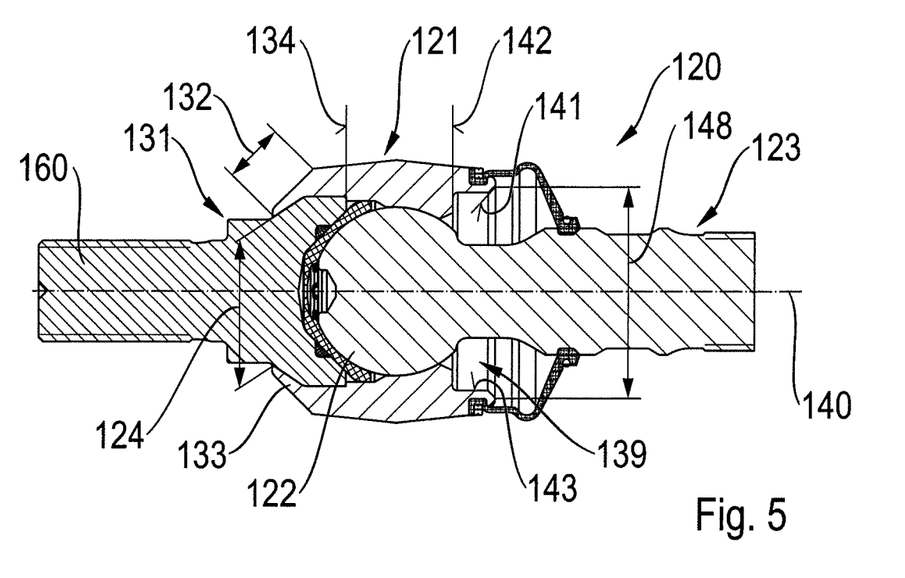
FIG. 5 is a sectional view of a portion of the ball joint from FIG. 4.

As can be seen from FIG. 5, the closing force absorber has a circumferential planar axial abutment surface 142 that extends perpendicular to central axis 140 and is exposed in direction of central axis 140. The axial abutment surface 142 is formed as an annular surface and is produced by chip-removing turning. Further, the closing force absorber 139 has a radial centering surface 143 that is formed as a cylindrical lateral surface and which is arranged adjacent to the axial abutment surface 142 and is likewise produced by turning. The closing force absorber 139 has a circumferential bevel 141 at a periphery facing the housing exterior. The ball joint 120 has a ball stud 123 that is rotatably movably and swivelably movably supported in housing 121 by a joint ball 122 and extends in an undeflected state out of a second opening 148 of housing 121 in direction of the central axis 140. The second opening 148 of housing 121, also referred to as stud-side opening, is arranged at an end of the housing 121 opposite the first opening 124. The first opening 124, also referred to as base-side opening, is surrounded by the circumferential compressing edge 133. The axial abutment surface 142 is formed as an annular surface with a central passage from which the ball stud 123 extends out of the housing 121. The joint ball 122 is enclosed in the housing 121 so as to be rotatably movable and swivelably movable by closing the housing 121.

In the undeflected position, shown in FIG. 5, of the ball stud 123, which is formed so as to be substantially rotationally symmetrical, the rotational axis of the ball stud 123 coincides with the central axis 140 of housing 121. In a projection in direction of the central axis 140, the axial abutment surface 142 lies partially outside of the joint ball 122. Consequently, the greatest diameter of the axial abutment surface 142 is greater than the diameter of the joint ball 122. The first opening 124 of housing 121 is closed by a base 131. Prior to closing, i.e., before the forming edge 133 has been deformed, housing 121 has in the area of the first opening 124 an output diameter 181 that is greater than the diameter of the joint ball 122. The base 131 of the ball joint formed as axial ball joint 120 is formed as a turned part having a thickness that varies in direction of central axis 140 and is therefore configured to receive forces acting in direction of the central axis 140 in the installed state of the axial ball joint 120.

Base 131 and circumferential compressing edge 133 have a mutual contact surface 132 formed as a frustoconical lateral surface. The base 131 is completely and sealingly enclosed by the compressing edge 133 when the housing 121 is closed.

Base 131 has a threaded pin 160 that is formed integrally with it and extends in direction of the central axis 140. The threaded pin 160 serves to connect the axial ball joint 120 to a connection component part. Inwardly, housing 121 has a stop surface 134 formed as annular surface for base 131, which stop surface 134 extends perpendicular to the central axis 140.

Figure 6:
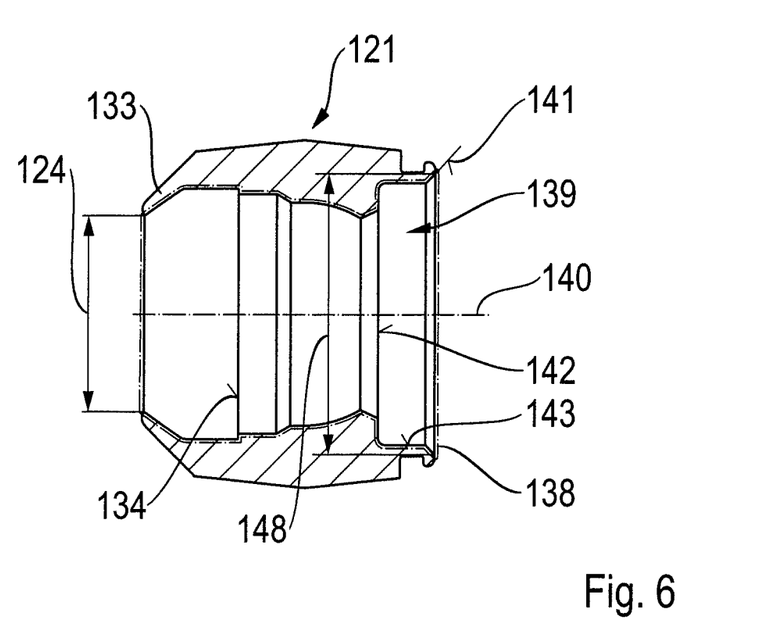
FIG. 6 is a sectional view of a housing of the ball joint from FIG. 5.

FIG. 6 shows that the housing 121 is formed in a sleeve-like manner so as to be completely rotationally symmetrical and has a housing interior 138 piercing the housing 121 completely in direction of the central axis 140. The housing interior 138 is again enclosed by a dash-dot line which, for the sake of clarity, does not cover the contour line defining the housing interior 138. The radial centering surface 143 adjoins the axial abutment surface 142 of the closing force absorber 139. The circumferential bevel 141 is arranged between the radial centering surface 143 and the periphery of the closing force absorber 139 surrounding the second opening 148. The periphery of the closing force absorber 139 at which the latter transitions into the housing surface simultaneously forms the transition from the housing interior 138 to the outer surface of the housing 121. The stop surface 134 is shown as a line extending perpendicular to central axis 140 so that it is clear that the stop surface 134 extends perpendicular to central axis 140. The circumferential compressing edge 133 is shown for purposes of illustration in the compressed state, i.e., as a finished part. The first opening 124, which simultaneously forms the smallest diameter of the circumferential compressing edge 133, is arranged at the end of the housing 121 opposite the closing force absorber 139 in direction of the central axis 140.

Figure 7:
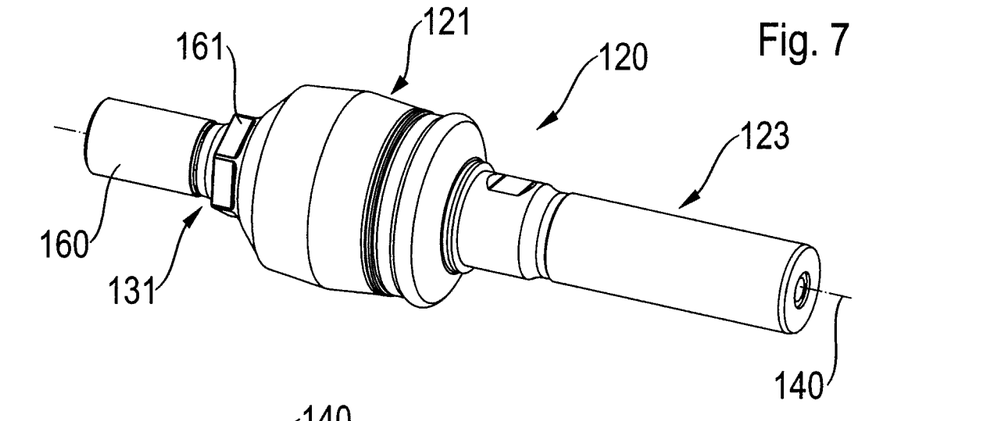
FIG. 7 is a perspective view of the ball joint.

It can be seen from FIG. 7 that a rotational symmetry of the ball stud 123 is interrupted by two wrench faces which are spaced apart parallel to one another, although one of the two wrench faces is concealed. The central axis 140 of housing 121 is coincident with the rotational axis of ball stud 123. At its outer circumference, the base 131 has a driving geometry formed as a hexagon 161. A rotational symmetry of the base 131 is interrupted by this hexagon 161. A rotational axis of base 131 is likewise coincident with the central axis 140 of housing 121. With the aid of hexagon 161, the threaded pin 160 of the axial ball joint 120 can be screwed to a connection component part.

Figures 8A, 8B:
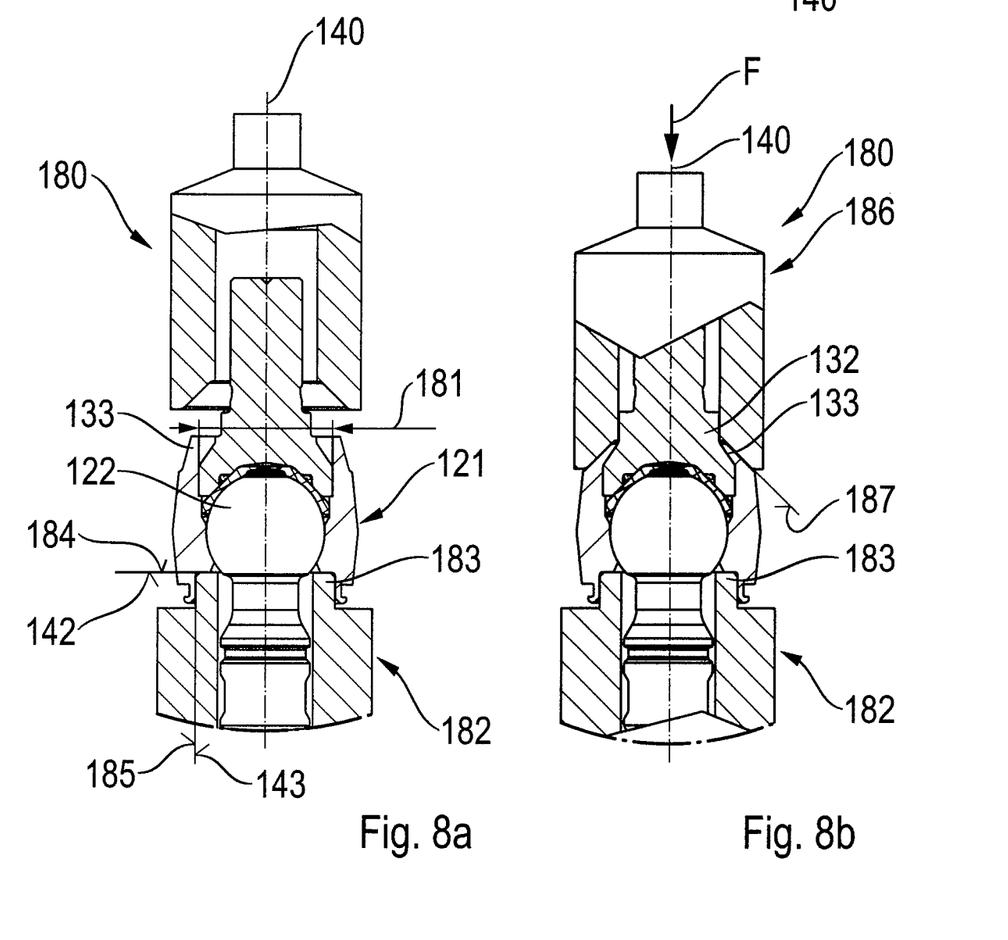
FIG. 8a is a partial sectional view of a closing device depicted in an open position for closing the housing from FIG. 6.
FIG. 8b is a partial sectional view of the closing device from FIG. 8a in a closed position.

FIG. 8*a* shows a closing device for closing the housing 121, which is formed as a compressing device 180. The closing of the housing 121 is one of the last work steps in the assembly of the axial ball joint 120 and is carried out through cold forming of the compressing edge 133 in direction of the joint ball 122. Before the compressing edge 133 has been deformed, i.e., in the not-closed state of the housing 121 shown in FIG. 8*a*, the compressing edge 133 has in the region of the first opening 124 a diameter 181 that is greater than the diameter of the joint ball 122. The compressing device 180 which is open in this view has a bottom part 182 with a counter-holder 183 that is surroundingly received by the closing force absorber 139. The planar axial abutment surface 142 of closing force absorber 139 contacts a correspondingly shaped axial receiving surface 184 of bottom part 182 with its full surface. Bottom part 182 further has a radial receiving surface 185 configured to correspond in shape to the radial centering surface 143 of the closing force absorber 139. Like the radial centering surface 143, the radial receiving surface 185 is formed as a cylindrical lateral surface and, together with axial receiving surface 184, forms outer circumferential surfaces of the counter-holder 183.

It can be seen from FIG. 8*b* that the counter-holder 183 of the compressing device 180 is surroundingly received by the closing force absorber 139 during the closing of the housing 121. The closing force F required for closing the housing 121 acts in direction of the central axis 140 of housing 121, which central axis 140 of housing 121 is coincident with a central axis of the compressing device 180. The compressing device 180, which is closed in this view, has a compression bell 186 which moves toward the bottom part 182 during the closing of the housing 121. The compression bell 186 has a compression cone 187 formed so as to be rotationally symmetrical and widens toward the bottom part 182 and which surrounds the compressing edge 133 and, while forming the mutual contact surface 132, presses the compressing edge 133 against the base 131 circumferentially during the closing of the housing 121. Because of a relatively large thickness of the compressing edge 133, an angle of approximately 45 degrees is sufficient for reliably receiving forces acting in direction of the central axis 140 during driving operation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A ball joint for a chassis of a motor vehicle, comprising: a ball stud; a housing receiving the ball stud therein, the housing having:
    a first opening at a first end of the housing surrounded by a circumferential forming edge;
    a base disposed within the housing between the ball stud and the circumferential forming edge and
    a closing force absorber arranged at a second end of the housing opposite the first opening and configured to absorb a closing force F applied to the first end of the housing required for a deformation of the circumferential forming edge into the base, wherein the closing force absorber extends in a trough-shaped manner toward the housing interior in direction of the first opening, wherein the closing force absorber is formed as a column-shaped and blind hole-like recess.

2. The ball joint according to claim 1, wherein the closing force absorber is formed rotationally symmetrically and has an axis of rotation that coincides with a central axis of the housing.

3. The ball joint according to claim 2, wherein the closing force absorber has a circumferential, planar axial abutment surface that extends perpendicular to the central axis and which is exposed in direction of the central axis.

4. The ball joint according to claim 3, wherein the axial abutment surface is a cutting-machined surface.

5. The ball joint according to claim 3, wherein the axial abutment surface is formed as an annular surface.

6. The ball joint according to claim 3, wherein the closing force absorber has a radial centering surface formed as a cylindrical lateral surface and arranged adjoining the axial abutment surface.

7. The ball joint according to claim 3, wherein the ball stud is rotatably movably and swivelably movably supported in the housing by a joint ball and which extends out of the second end of the housing in direction of the central axis in an undeflected state.

8. The ball joint according to claim 7, wherein the axial abutment surface lies partially outside of the joint ball in a projection in direction of the central axis.

9. The ball joint according to claim 2, wherein the first opening of the housing is closed by the base.

10. The ball joint according to claim 9, wherein the base and the circumferential forming edge have a mutual contact surface which is formed as a frustoconical lateral surface or as an annular surface.

11. The ball joint according to claim 9, wherein the base has a threaded pin that is formed integral with the base and which extends in a direction of the central axis.

12. The ball joint according to claim 2, wherein the housing is formed like a sleeve with a housing interior piercing the housing completely in direction of the central axis.

13. The ball joint according to claim 2, wherein the housing has a connection pin connected integrally to the housing and which extends at least substantially perpendicular to the central axis.

14. The ball joint according to claim 1, wherein the closing force absorber has a circumferential bevel at a periphery facing an outside of the housing.

15. A method for fitting a ball joint for a chassis of a motor vehicle, the ball joint having a ball stud, a housing receiving the ball stud therein, the housing including a first opening at a first end of the housing surrounded by a circumferential forming edge; a base disposed within the housing between the ball stud and the circumferential forming edge; and a closing force absorber arranged at a second end of the housing opposite the first opening and configured to absorb a closing force F applied to the first end of the housing required for a deformation of the circumferential forming edge into the base, wherein the closing force absorber extends in a trough-shaped manner toward the housing interior in direction of the first opening, wherein the closing force absorber is formed as a column-shaped and blind hole-like recess, the method comprising:

surroundingly receiving a counter-holder of a closing device is by the closing force absorber; and     closing the housing by deforming the circumferential forming edge into the base.

* * * * *